US008631608B1

(12) United States Patent
Konchan et al.

(10) Patent No.: US 8,631,608 B1

(45) Date of Patent: Jan. 21, 2014

(54) VEHICLE LATCH SYSTEM WITH OVER-SLAM BUMPER

(71) Applicant: GM Global Technology Operations, LLC, Detroit, MI (US)

(72) Inventors: Jeffrey L. Konchan, Romeo, MI (US); Frank J. Arabia, Jr., Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/670,913

(22) Filed: Nov. 7, 2012

(51) Int. Cl.
*B60J 10/04* (2006.01)

(52) U.S. Cl.
USPC .................. 49/472; 292/341.12; 292/DIG. 56

(58) Field of Classification Search
USPC ......... 49/472; 292/216, 337, 341.12, DIG. 56
See application file for complete search history.

(56) References Cited

U.S. PATENT DOCUMENTS

| | | | | | |
|---|---|---|---|---|---|
| 3,371,948 | A | * | 3/1968 | Velavicius | 292/216 |
| 4,165,112 | A | * | 8/1979 | Kleefeldt | 292/216 |
| 4,288,117 | A | * | 9/1981 | Nardi | 292/52 |
| 4,358,141 | A | * | 11/1982 | Hamada | 292/216 |
| 4,756,563 | A | * | 7/1988 | Garwood et al. | 292/216 |
| 4,941,696 | A | * | 7/1990 | Yamada et al. | 292/340 |
| 5,020,838 | A | * | 6/1991 | Fukumoto | 292/201 |
| 5,064,229 | A | * | 11/1991 | Hamada et al. | 292/216 |
| 5,106,134 | A | * | 4/1992 | Thau | 292/216 |
| 5,141,270 | A | * | 8/1992 | Shibata | 292/216 |
| 5,727,825 | A | * | 3/1998 | Spurr | 292/341.12 |
| 7,258,373 | B2 | * | 8/2007 | Plett et al. | 292/210 |
| 7,306,269 | B2 | * | 12/2007 | Cetnar et al. | 292/341.12 |
| 7,845,692 | B2 | * | 12/2010 | Inan et al. | 292/216 |
| 8,342,582 | B2 | * | 1/2013 | Bendel et al. | 292/216 |
| 2004/0227355 | A1 | * | 11/2004 | Koike et al. | 292/216 |
| 2004/0227356 | A1 | * | 11/2004 | Koike et al. | 292/216 |
| 2009/0224559 | A1 | * | 9/2009 | Park | 292/336.3 |

* cited by examiner

*Primary Examiner* — Jerry Redman

(74) *Attorney, Agent, or Firm* — Quinn Law Group, PLLC

(57) ABSTRACT

A latch system for securing a panel assembly in a closed position relative to a body of a vehicle includes a striker and a latch mechanism positioned relative to each other within an allowable assembly variance measured along a lateral axis. A bumper is fixed in position relative to the latch mechanism to engage the striker in abutting engagement when the striker is disposed in the closed position. The bumper includes a contact surface having an axial length measured along the lateral axis. The contact surface completely contacts the striker along the entire axial length of the contact surface when the striker is disposed in any position within the allowable assembly variance relative to the latch mechanism.

14 Claims, 3 Drawing Sheets

VEHICLE LATCH SYSTEM WITH OVER-SLAM BUMPER

TECHNICAL FIELD

The invention generally relates to a latch system for securing a panel assembly in a closed position relative to a body of a vehicle.

BACKGROUND

Latch systems for a closure assembly of a vehicle typically include a latch mechanism having a fork bolt or a ratchet, which engages a striker in locking engagement. The latch mechanism is typically attached to the closure assembly, and the striker is typically attached to a body of the vehicle. However, it should be appreciated that the relative positions of the latch mechanism and the striker may be reversed, with the striker attached to the closure assembly, and the latch mechanism attached to the body. Locking engagement between the fork bolt and the striker provides a latching force that secures the closure assembly relative to the body of the vehicle. The closure assembly may include, but is not limited to a side passenger door, a rear cargo door, or a rear liftgate.

The latch mechanism typically includes a bumper that engages the striker as the closure assembly moves into a closed position to prevent over travel of the striker relative to the fork bolt. The bumper is manufactured from a compressible, resilient material that absorbs energy. The closure assembly, and more specifically, the striker, compresses at least a portion of the bumper when moving into the closed position. The amount or volume of the bumper that is compressed during closure affects the effort required to move the closure assembly into the closed position, i.e., the closing effort. If the striker engages a larger area of the bumper, the closing effort is greater, whereas if the striker engages a smaller area of the bumper, the closing effort is less.

Due to manufacturing and/or assembly tolerances and variations, the relative sideway or transverse positions between the striker and the latch mechanism may vary. Accordingly, the latch system must account for this lateral variation, while maintaining a consistent closing effort.

SUMMARY

A vehicle is provided. The vehicle includes a body defining an opening, and a closure assembly moveably attached to the body. The closure assembly is moveable between an open position and a closed position. A latch system is operable to secure the closure assembly relative to the body when the closure assembly is disposed in the closed position. The latch system includes a striker and a latch mechanism. The striker is attached to one of the body and the closure assembly, and the latch mechanism is attached to the other of the body and the closure assembly. The striker and the latch mechanism are positioned relative to each other within an allowable assembly variance measured along a lateral axis when the closure assembly is disposed in the closed position. A bumper is fixed in position relative to the latch mechanism to engage the striker in abutting engagement when the striker is disposed in the closed position. The bumper includes a contact surface having an axial length measured along the lateral axis. The contact surface completely contacts the striker along the entire axial length of the contact surface when the striker is disposed in any position within the allowable assembly variance relative to the latch mechanism.

A latch system for securing a panel assembly in a closed position relative to a body of a vehicle is also provided. The latch system includes a striker and a latch mechanism positioned relative to each other within an allowable assembly variance measured along a lateral axis. A bumper is fixed in position relative to the latch mechanism to engage the striker in abutting engagement when the striker is disposed in the closed position. The bumper includes a contact surface having an axial length measured along the lateral axis. The contact surface completely contacts the striker along the entire axial length of the contact surface when the striker is disposed in any position within the allowable assembly variance relative to the latch mechanism.

Accordingly, because the entire length of the contact surface of the bumper engages the striker, regardless of the exact position of the striker within the allowable assembly variance between the striker and the latch mechanism, the volume of the bumper that is compressed as the closure assembly moves into the closed position remains substantially consistent, thereby providing a consistent closing effort.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims.

Figure 1:
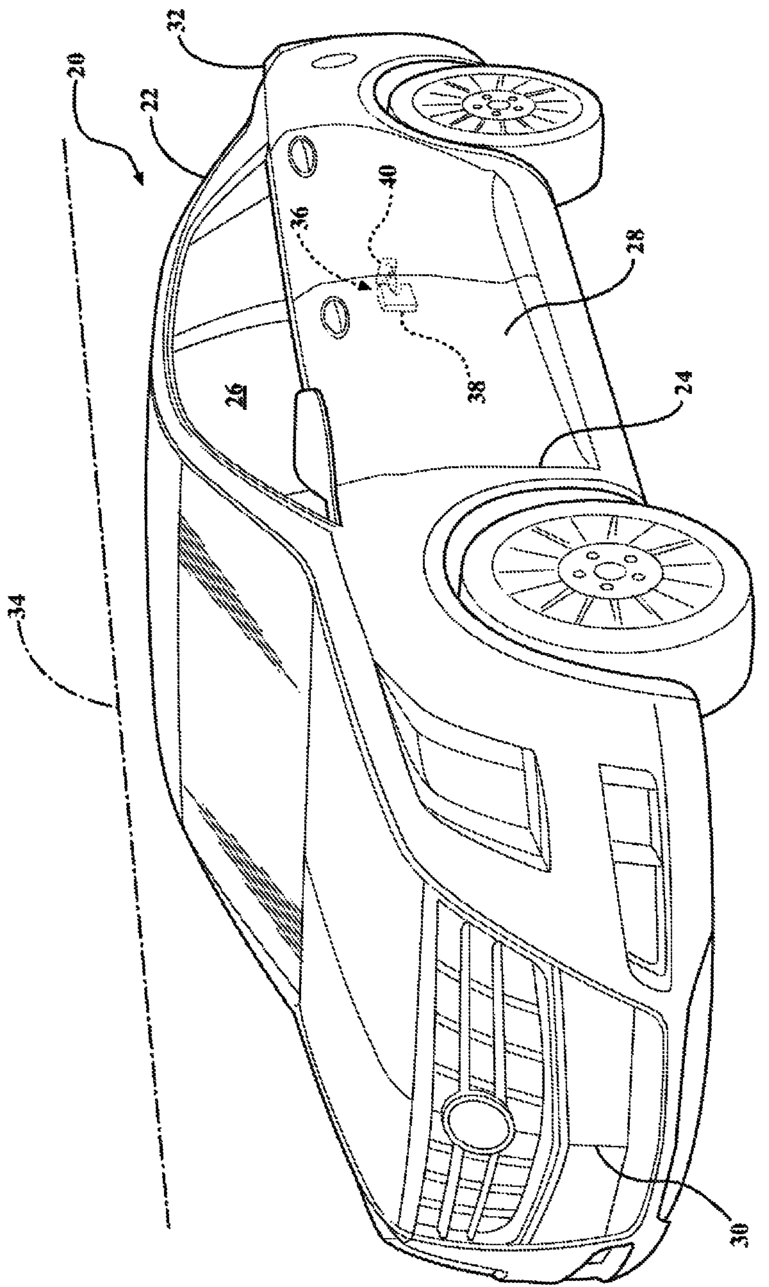
FIG. 1 is a schematic perspective view of a vehicle.

Referring to the Figures, wherein like numerals indicate like parts throughout the several views, a vehicle is generally shown at 20. Referring to FIG. 1, the vehicle 20 may include any type and/or style of vehicle having a body 22 that defines an opening 24 allowing access to an enclosed compartment 26, such as a passenger compartment or a cargo area. A closure assembly 28, e.g., a door, is moveably attached to the body 22 and is disposed within the opening 24. The closure assembly 28 is moveable between an open position to allow access to the enclosed compartment 26, and a closed position to seal the enclosed compartment 26. The vehicle 20 may include, but is not limited to, a sedan, a sport utility vehicle, or a van.

The opening 24 and the closure assembly 28 may be disposed at any location on the body 22. As shown in FIG. 1, the closure assembly 28 is shown as a side door of the vehicle 20. However, it should be appreciated that the closure assembly 28 may include a rear liftgate or cargo door of the vehicle 20. As shown in FIG. 1, the body 22 includes a forward end 30 and a rearward end 32. The forward end 30 is spaced from the rearward end 32 along a longitudinal axis 34 that extends between the forward end 30 and the rearward end 32. The opening 24 is disposed on a side of the body 22. The opening 24 is laterally offset from the longitudinal axis 34. The opening 24 may be disposed on either a driver side of the vehicle

20 or a passenger side of the vehicle 20. While the description describes only a single opening 24 located on one side of the vehicle 20, it should be appreciated that the vehicle 20 may include two or more openings 24, located on both sides of the vehicle 20.

Figure 2:
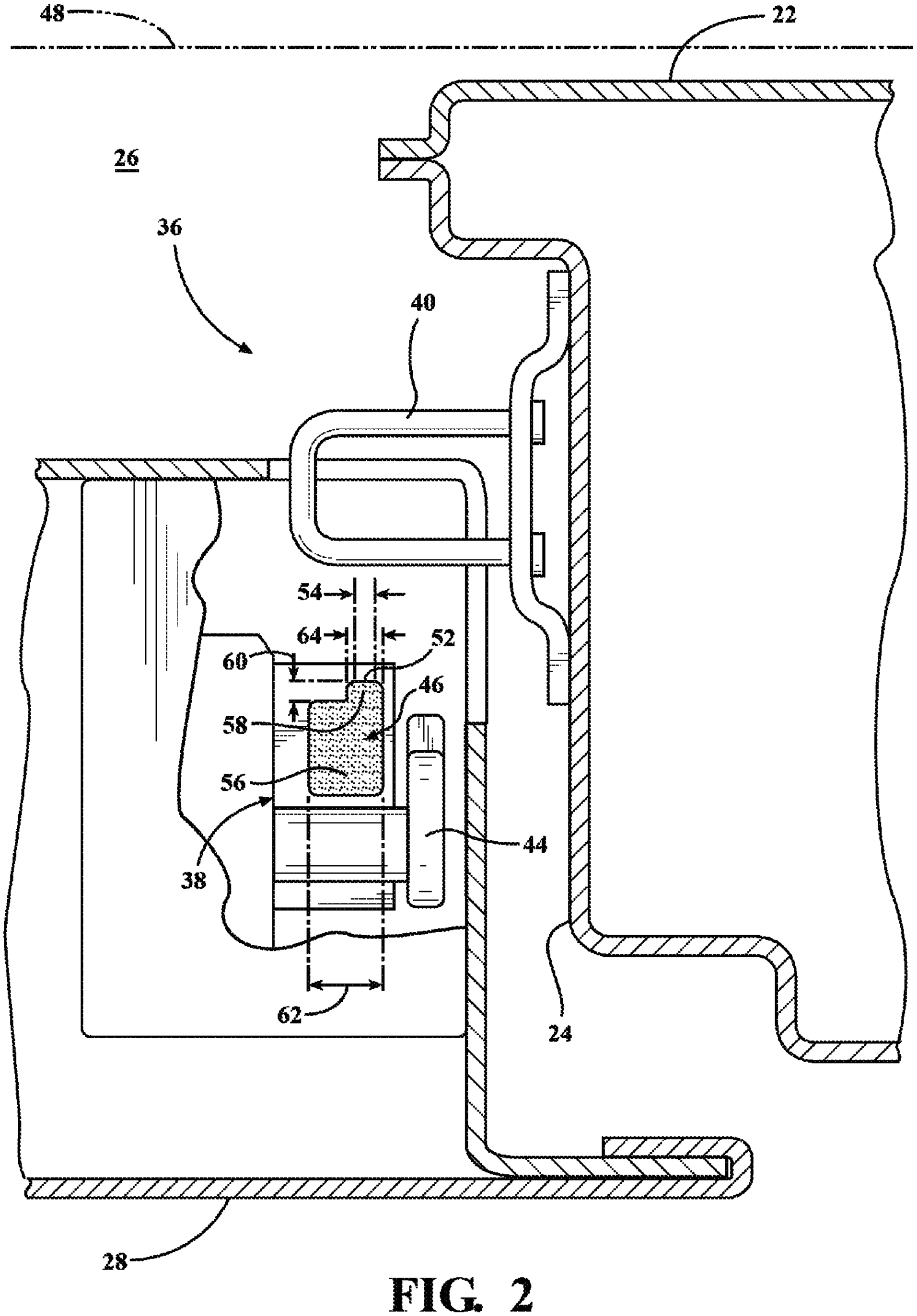
FIG. 2 is a schematic partially cross sectioned plan view of a latch system of the vehicle, showing the latch system in an open or unlatched configuration.
Figure 3:
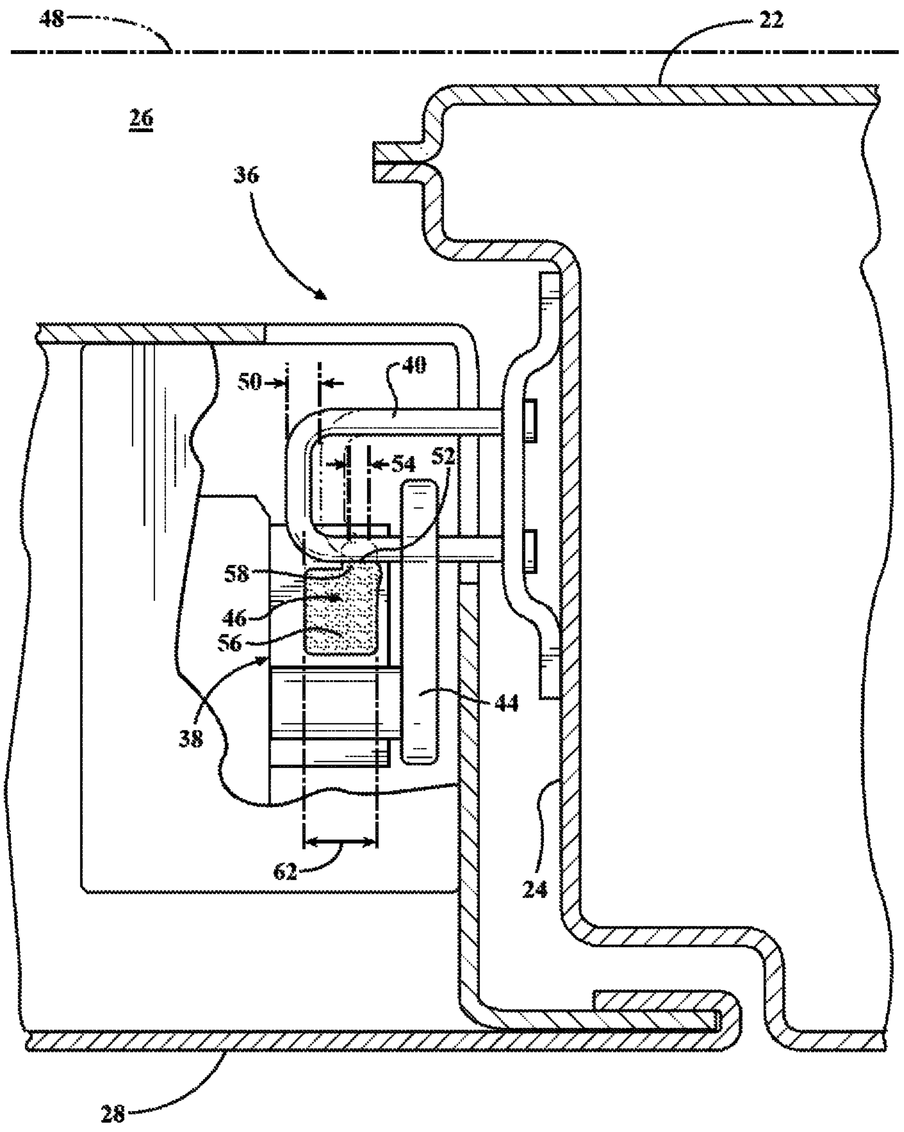
FIG. 3 is a schematic partially cross sectioned plan view of the latch system in a closed or latched configuration.

Referring to FIGS. 2 and 3, a latch system 36 is operable to secure the closure assembly 28 relative to the body 22 when the closure assembly 28 is disposed in the closed position. The latch system 36 includes a latch mechanism 38 and a striker 40. As shown, the latch mechanism 38 is internally mounted to the closure assembly 28 within an interior cavity of the closure assembly 28, and the striker 40 is attached to the body 22. However, it should be appreciated that the relative positions of the latch mechanism 38 and the striker 40 may be reversed from that shown in FIGS. 2 and 3, with the striker 40 attached to the closure assembly 28, and the latch mechanism 38 attached to the body 22.

The latch mechanism 38 is moveable between an un-latched position, shown in FIG. 2, and a latched position, shown in FIG. 3. When disposed in the un-latched position, the latch mechanism 38 allows movement of the closure assembly 28 between the open position and the closed position. When disposed in the latched position, the latch mechanism 38 is operable to secure the door relative to the body 22 in the closed position. The latch mechanism 38 may include any style and/or configuration of latch suitable for use in the vehicle 20. Typically, the latch mechanism 38 includes a fork bolt 44. When the latch mechanism 38 is disposed in the latched position, the fork bolt 44 is disposed in grasping engagement with the striker 40 to secure the closure panel relative to the body 22. When the latch mechanism 38 is disposed in the un-latched position, the fork bolt 44 is disengaged from the striker 40. However, it should be appreciated that the scope of the claims should not be limited to the specific configuration and/or operation of the latch mechanism 38.

The latch system 36 includes a bumper 46 that is fixed in position relative to the latch mechanism 38. The bumper 46 includes a compressible, resilient material, such as but not limited to a rubber material. As best shown in FIG. 3, the bumper 46 is positioned to engage the striker 40 in abutting engagement when the closure assembly 28 is disposed in the closed position. As the closure assembly 28 moves from the open position into the closed position, the striker 40 contacts and slightly compresses at least a portion of the bumper 46, whereby the bumper 46 absorbs some energy and prevents over-travel of the closure assembly 28, i.e., the bumper 46 prevents the closure assembly 28 from moving beyond the appropriate closed position. As shown in FIGS. 2 and 3, the bumper 46 is directly attached to the latch mechanism 38. However, it should be appreciated that the bumper 46 need not be directly attached to the latch mechanism 38.

When the closure assembly 28 is disposed in the closed position, the striker 40 and the latch mechanism 38 are positioned relative to each other along a lateral axis 48. The lateral axis 48 generally runs laterally, i.e., side ways, relative to the movement between the latch mechanism 38 and the striker 40. Accordingly, as shown in FIGS. 2 and 3, the lateral axis 48 is coaxial with the longitudinal axis 34 of the vehicle 20 because the closure assembly 28 is shown as a side door. However, it should be appreciated that if the closure assembly 28 is configured as a liftgate at a rear of the vehicle 20, than the lateral axis 48 would be disposed transverse or substantially perpendicular to the longitudinal axis 34 of the vehicle 20.

Referring to FIG. 3, due to a plurality of different manufacturing and assembly variances and/or tolerances, the exact position of the fork bolt 44 relative to the striker 40 along the lateral axis 48 may vary within an allowable assembly variance 50. The allowable assembly variance 50 is measured along the lateral axis 48. Accordingly, as shown in FIGS. 2 and 3, because the closure assembly 28 is depicted as a side door, the allowable assembly variance 50 may be described as a for-aft variance of the striker 40 relative to the latch mechanism 38. As shown in FIG. 3, the striker 40 is shown in both solid lines and in phantom lines to demonstrate the limits of the allowable assembly variance 50 along the lateral axis 48. Accordingly, due to manufacturing build variation and assembly tolerances, the exact position of the striker 40, and therefore the relative position between the striker 40 and the latch mechanism 38, may vary between the position of the striker 40 shown in phantom lines and the position of the striker 40 shown in solid lines.

The bumper 46 includes a contact surface 52 that is positioned to contact the striker 40 as described above. The contact surface 52 includes an axial length 54 measured along the lateral axis 48. The length of the contact surface 52 is less than the allowable assembly variance 50 as measured along the lateral axis 48. Preferably, the length of the contact surface 52 is between the range of 4 mm and 10 mm. The bumper 46 is shaped and the contact surface 52 is positioned so that the contact surface 52 is the only portion of the bumper 46 to contact the striker 40, and so that the contact surface 52 completely contacts the striker 40 along the entire axial length 54 of the contact surface 52, when the striker 40 is disposed in any position within the allowable assembly variance 50. Because the entire length of the contact surface 52 engages the striker 40, regardless of the relative position of the striker 40 and the latch mechanism 38 within the allowable assembly variance 50, the force required to move the closure assembly 28 into the closed position remains constant.

As shown, the bumper 46 includes a body portion 56 and a contact portion 58. The contact portion 58 of the bumper 46 is positioned adjacent the fork bolt 44, and extends from the body portion 56 to present the contact surface 52. The contact portion 58 extends outwardly away from the body portion 56 a separation distance 60. Preferably, the separation distance 60 is at least equal to or greater than 6 mm. The contact portion 58 and the body portion 56 may each include a common or identical thickness, or may alternatively include a different thickness. The body portion 56 includes a first width 62 measured along the lateral axis 48. Preferably, the first width 62 is between the range of 12 mm and 20 mm. The contact portion 58 includes a second width 64 as measured along the lateral axis 48. The second width 64 is less than the first width 62. Preferably, the second width 64 is between the range of 4 mm and 10 mm. As shown in FIG. 2, the axial length 54 of the contact surface 52 is less than the second width 64 of the contact portion 58. This is because of the radii at the outer corners of the contact portion, which reduce the length of the axial length 54 from the second width 64. It should be appreciated that if the contact portion 58 defined right angled outer corners, then the axial length 54 would equal the second width 64. Because of the radiused corners on the contact portion 58, which are shown in FIG. 2, the actual contact length between the contact portion 58 and the striker 40 may include a length along the lateral axis 48 that is greater than the axial length 54 of the contact surface 52 as the contact portion 58 compresses against the striker 40, such as shown in FIG. 3.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A vehicle comprising:

a body defining an opening;

a closure assembly moveably attached to the body and moveable between an open position and a closed position; and a latch system operable to secure the closure assembly relative to the body when the closure assembly is disposed in the closed position, the latch system including:

a striker attached to one of the body and the closure assembly, and a latch mechanism attached to the other of the body and the closure assembly, wherein the striker and the latch mechanism are positioned relative to each other within an assembly variance measured along a lateral axis when the closure assembly is disposed in the closed position;

a bumper fixed in position relative to the latch mechanism to engage the striker in abutting engagement when the striker is disposed in the closed position;

wherein the bumper includes a contact surface having an axial length measured along the lateral axis;

wherein the contact surface contacts the striker along the axial length of the contact surface when the striker is disposed in any position within the assembly variance relative to the latch mechanism;

wherein the bumper includes a body portion having a first width measured along the lateral axis, and a contact portion extending from the body portion to present the contact surface and having a second width measured along the lateral axis, wherein the second width is less than the first width;

wherein the length of the contact surface is less than the assembly variance measured along the lateral axis; and wherein the length of the contact surface is between the range of 4 mm and 10 mm.

2. A vehicle as set forth in claim 1 wherein the contact portion extends outwardly away from the body portion a separation distance prior to contacting the striker.

3. A vehicle as set forth in claim 2 wherein the separation distance is at least equal to or greater than 6 mm.

4. A vehicle as set forth in claim 1 wherein the body portion and the contact portion each include a common thickness.

5. A vehicle as set forth in claim 1 wherein the bumper includes a compressible, resilient material.

6. A vehicle as set forth in claim 1 wherein the bumper is directly attached to the latch mechanism.

7. A vehicle as set forth in claim 1 wherein the striker is attached to the body and the latch mechanism is attached to the closure assembly.

8. A vehicle as set forth in claim 1 wherein the latch mechanism includes a fork bolt moveable between a latched position in grasping engagement with the striker and an unlatched position disengaged from the striker, wherein the contact portion of the bumper is positioned adjacent the fork bolt.

9. A latch system for securing a panel assembly in a closed position relative to a body of a vehicle, the latch system comprising:

a striker and a latch mechanism positioned relative to each other within an assembly variance measured along a lateral axis, when disposed in a closed position;

a bumper fixed in position relative to the latch mechanism to engage the striker in abutting engagement when the striker is disposed in the closed position;

wherein the bumper includes a contact surface having an axial length measured along the lateral axis; and wherein the contact surface contacts the striker along the axial length of the contact surface when the striker is disposed in any position within the assembly variance relative to the latch mechanism;

wherein the bumper includes a body portion having a first width measured along the lateral axis, and a contact portion extending from the body portion to present the contact surface and having a second width measured along the lateral axis, wherein the second width is less than the first width;

wherein the length of the contact surface is less than the assembly variance measured along the lateral axis; and wherein the length of the contact surface is between the range of 4 mm and 10 mm.

10. A latch system as set forth in claim 9 wherein the contact portion extends outwardly away from the body portion a separation distance.

11. A latch system as set forth in claim 10 wherein the separation distance is at least equal to or greater than 6 mm.

12. A latch system as set forth in claim 9 wherein the body portion and the contact portion each include a common thickness.

13. A latch system as set forth in claim 9 wherein the bumper includes a compressible, resilient material.

14. A latch system as set forth in claim 9 wherein the latch mechanism includes a fork bolt moveable between a latched position in grasping engagement with the striker and an unlatched position disengaged from the striker, wherein the bumper is directly attached to the latch mechanism with the contact portion positioned adjacent the fork bolt.

* * * * *